July 23, 1963 G. L. CLAPPER 3,098,939

INTEGRATING PULSE CIRCUIT HAVING REGENERATIVE
FEED BACK TO EFFECT PULSE SHAPING
Filed Dec. 21, 1961

INVENTOR
GENUNG L. CLAPPER

BY G. R. Gugger
AGENT

United States Patent Office 3,098,939
Patented July 23, 1963

3,098,939

INTEGRATING PULSE CIRCUIT HAVING REGENERATIVE FEED BACK TO EFFECT PULSE SHAPING

Genung L. Clapper, Vestal, N.Y., assignor to International Business Machines Corporation, New York, N.Y., a corporation of New York Filed Dec. 21, 1961, Ser. No. 161,181
7 Claims. (Cl. 307—88.5)

This invention relates to a pulse shaping circuit and more particularly to a circuit which combines integration with pulse shaping.

Integrator circuits ordinarily produce poorly shaped output pulses that must be shaped up with additional circuitry. In addition, it has been found that most integrator circuits operate with uncertainties as they pass a threshold point, they tend to jitter in response to a series of changing pulses, and they generally produce an output waveform having a saw tooth or ramp function. In integrating the output of an audio amplifier, for example, to indicate the presence of a packet of pulses at a given frequency, and then presenting the integrated output to a transient detection scheme for the purpose of detecting only meaningful changes in the audio output, it was found to be not only desirable but necessary to provide an integrator circuit that produced output waveforms which are square and well-shaped with fast leading and falling edges.

The present invention meets the above desired conditions and in its preferred embodiment takes the form of an integrator circuit having a degenerative feedback which is used during integration and a regenerative feedback which comes into play at the proper time to shape the output pulse. The first pulses of a series will be integrated and a first transistor is switched into conduction. Integration continues as a degenerative feedback path is provided and when a threshold is reached, a second transistor is switched into conduction. A regenerative feedback from the output of the second transistor overrides the degenerative feedback and both transistors are driven into solid conduction. When the input pulses cease, the second transistor is switched out of conduction and the regenerative feedback again overrides the degenerative feedback and both transistors are driven to cutoff and there is produced a good square output pulse.

Accordingly, a principal object of the present invention is to provide an improved integrating and pulse shaping circuit.

A further object of the present invention is to provide an improved integrating and pulse shaping circuit which has the ability to switch automatically from an integrating process to a pulse shaping process and then back to an integrating process again as input conditions demand.

A still further object of the present invention is to provide an integrating pulse shaper circuit which includes a degenerative feedback loop for making the decision as to whether or not to give an output and a regenerative feedback loop for making the output turn on and turn off sharp.

The foregoing and other objects, features and advantages of the invention will be apparent from the following more particular description of a preferred embodiment of the invention, as illustrated in the accompanying drawings.

Figure 1:
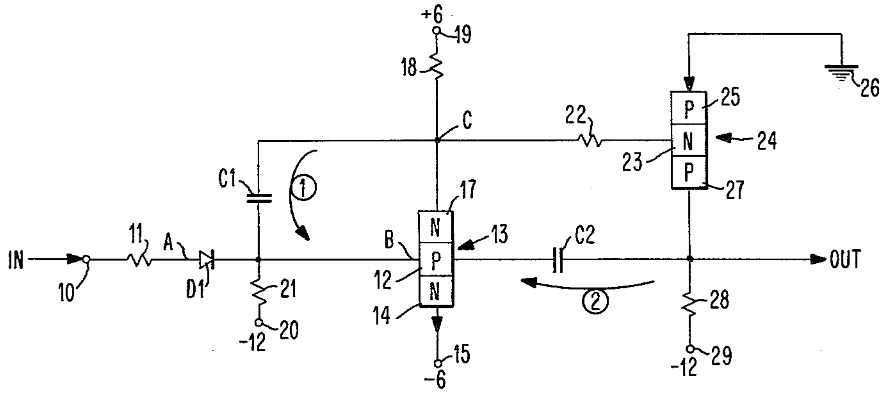
FIG. 1 shows an embodiment of an integrating pulse shaper circuit in accordance with the present invention.

Referring to FIG. 1, an input terminal 10 is shown connected by way of a resistor 11 and input diode D1 to the base electrode 12 of an NPN type transistor 13. The transistor 13 is a current operated voltage amplifier and inverter and has an emitter electrode 14 connected to a negative 6 volt terminal 15 and a collector electrode 17 connected through a resistor 18 to a positive 6 volt terminal 19. A negative 12 volt terminal 20 provides bias voltage to the base 12 through a resistor 21.

The collector output of transistor 13 is taken from junction point C and is applied through a resistor 22 to the base electrode 23 of a PNP type transistor 24. Transistor 24 is also a current operated voltage amplifier and inverter and has an emitter electrode 25 connected to a source of ground potential 26 and a collector electrode 27 connected by way of resistor 28 to a negative 12 volt terminal 29.

A pair of capacitors C1 and C2 are provided which together control the input pulse resolution and the minimum output pulse width. Although not necessary, it has been found that the best results are obtained when the capacitors are equal in value. Capacitor C1 is connected to provide a degenerative feedback path 1 from the collector 17 to the base 12 of transistor 13 and the capacitor C2 is connected to provide a regenerative feedback path 2 from the collector 27 of transistor 24 to the base 12 of transistor 13. As will be seen, the degenerative feedback loop makes the decision to flip the circuit and put out a binary indication and it will effect integration throughout the time that the circuit is in a quiescent state between decisions. However, every time a decision is made and the circuit changes, the regenerative feedback loop comes into play to momentarily override the degenerative loop and shape the edge of the pulse.

The train of pulses 30 (FIG. 2), which are applied to the input terminal 10, are shown as quantized pulses which may be taken from suitable frequency selecting amplifiers by way of clipping amplifiers, however, it should be pointed out that such a quantized input is not necessary to the operation of the present circuit and that a good square wave output may be produced from a sine wave input, as well.

Figure 2:
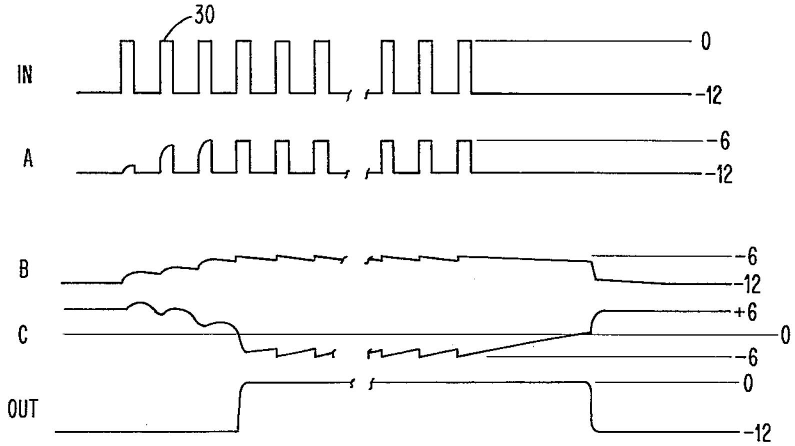
FIG. 2 is a diagram showing representative waveforms for the circuit shown in FIG. 1.

With no input pulses applied, the potential at point B is at negative 12 volts and the potential at point C is at positive 6 volts and accordingly, both transistors 13 and 24 are cut off and the output is at negative 12 volts. The presence of the first input pulse will render the input diode D1 conductive and current will flow from the input through the diode to the capacitor C1 and the base 12 and the potential at points A and B will rise. The potential at point C in the collector circuit will be bumped up as shown in FIG. 2. Current flow through the bias resistor 21 will be negligible and may be disregarded. The first pulses of the series will be integrated and the voltage at points A and B will rise until the negative 6 volt emitter bias is overcome and transistor 13 will go into conduction.

With transistor 13 in conduction, the potential at point C drops and collector current is fed in the degenerative path back to capacitor C1. This collector current restricts or cancels out the input current supplied to the capacitor and there is left only a small amount of current flowing into the base 12. As a result, the current gain between the collector and base of transistor 13 is made very low and it approaches unity. Integration now continues as in a "Miller integrator" as capacitor C1 provides the degenerative feedback path. When a sufficient number of pulses come in to integrate to a point where the potential at point C drops below a threshold position, which in the circuit shown is ground, transistor 24 goes into conduction and its collector output rises. This rising transient is reflected back through capacitor C2 to the integrating point and will actually overpower it. The circuit mode now becomes regenerative instead of degenerative and the rise at the output of transistor 24 will overcome any tendency of the drop at the input of transistor 13 to lower the base voltage.

Thinking in terms of current, the gain of transistor 24 has not been altered and hence the current gain between the collector and base may be anywhere between 50 and 150. This allows transistor 24 to maintain control of the circuit. The current in the regenerative feedback loop 2 will be greater than the current that flows in the degenerative feedback loop 1 and transistor 13 is turned more on resulting in an increased drop of potential at point C which turns transistor 24 on harder. The action is regenerative. Therefore, at the time that the circuit makes a decision to produce an output, it goes into a strong regenerative operation, much like a single shot, to drive both transistors into solid conduction and to produce a sharp output pulse. During the train of input pulses, the degenerative feedback path through capacitor C1 will reflect the positive rise in potential which will occur at point C in between occurrence of the input pulses to keep the transistor 13 from turning off. This keeps transistor 13 in conduction and the output remains at 0 volts.

It is interesting to note that as soon as the threshold point is passed and the front end of the pulse has been established, the circuit immediately switches back to the degenerative mode because current will have ceased to flow in the regenerative feedback loop 2. Now any change at point C will be fed back degeneratively and integration is resumed. In effect, then, the circuit automatically switches from integration to pulse shaping and then right back to integration so that integration is carried out practically all the time except for the time that a decision is being made. Returning back to integration allows the circuit to faithfully turn off at the time it should, which is sometime after the input pulses have ceased or perhaps got weaker in amplitude.

When the input pulses cease, the potential at point C rises until transistor 24 cuts off. At this point, the output drops sharply and this transient is passed by capacitor C2 to again override the degenerative feedback, with the result that both transistors are strongly driven to cutoff to produce a sharp drop in the output pulse. If desired, the shape of the output pulse may be changed by connecting a suitable resistor between the base electrode 12 and capacitor C2 to limit the amount of current that will flow in the regenerative feedback loop 2.

Isolated pulses or noise will not produce an output and input pulses meeting minimum resolution requirements will be integrated and a shaped output produced. The input pulses are shown equally spaced and of equal amplitude for purposes of illustration. In practice, the pulses may be of different widths, spacing and amplitude as long as they meet the minimum requirements.

In addition to integrating the output of an audio amplifier, other uses of the present circuit are: a pulse monitor, de-modulator, a counter carry end detection circuit, or a pulse operated switch.

While the invention has been particularly shown and described with reference to a preferred embodiment thereof, it will be understood by those skilled in the art that various changes in form and details may be made therein without departing from the spirit and scope of the invention.

What is claimed is:

1. An integrating pulse shaper comprising, a first amplifier inverter means having an output circuit, a source of input signal pulses, input circuit means connected between said signal source and said amplifier inverter means, a second amplifier inverter means connected to the output of said first amplifier inverter means and including an output circuit, degenerative feedback circuit means including an integrating capacitor connected between the output circuit of said first amplifier inverter means and said input circuit means and responsive to said input pulses to control operation of said first and second amplifier inverter means to produce an integrated output pulse in the output circuit of said second amplifier inverter means, and a regenerative feedback circuit means including a pulse shaping capacitor connected between the output circuit of said second amplifier inverter means and the input circuit means of said first amplifier inverter means and responsive to the operation of said second amplifier inverter means for controlling the operation of both said amplifier inverter means to shape said integrated output pulse.

2. An integrating pulse shaper comprising, a first amplifier inverter means having an output circuit, a source of input pulses, input circuit means connected between said signal source and said amplifier inverter means, a second amplifier inverter means connected to the output of said first amplifier inverter means and including an output circuit, degenerative feedback circuit means connected between the output circuit of said first amplifier inverter means and said input circuit means and responsive to said input pulses for effecting operation of said first and second amplifier inverter means in an integrating mode to produce an integrated output pulse in the output circuit of said second amplifier means, and a regenerative feedback circuit means connected between the output circuit of said second amplifier inverter means and the input circuit means of said first amplifier inverter means and responsive to the transient portions of said integrated output pulse for effecting operation of both said amplifier inverter means in a pulse shaping mode to shape said integrated output pulse.

3. An integrating pulse shaper as defined in claim 2 and including means associated with said degenerative feedback circuit means for restricting the gain of said first amplifier inverter means, and means associated with said regenerative feedback circuit means whereby said regenerative feedback circuit momentarily overrides said degenerative feedback circuit during the transient portions of said integrated output pulse to effect shaping of said output pulse.

4. An integrating pulse shaper comprising, a first transistor having base, emitter and collector electrodes, a source of input pulses, input circuit means connected between said pulse source and the base of said first transistor, a second transistor having base, emitter and collector electrodes, circuit means connecting the collector of said first transistor with the base of said second transistor, degenerative feedback circuit means including an integrating capacitor connected between the collector of said first transistor and said input circuit means and responsive to said input pulses to control operation of said first and second transistors to produce an integrated output pulse at the collector of said second transistor, and a regenerative feedback circuit means including a pulse shaping capacitor connected between the collector of said second transistor and the base of said first transistor and responsive to the operation of said second transistor for controlling the operation of both of said transistors to shape said integrated output pulse.

5. An integrating pulse shaper comprising, first and second transistors of opposite conductivity types, each of said transistors including base, emitter and collector electrodes, and having a common emitter configuration, means for biasing said transistors in a normally nonconductive state, a source of input pulses, input circuit means connected between said pulse source and the base of said first transistor, a first capacitor connected between the collector and base of said first transistor for integrating said input pulses and switching said first transistor into conduction, circuit means connecting the collector of said first transistor with the base of said second transistor and effective upon conduction of said first transistor to render said second transistor conductive to produce an integrated output signal, and a second capacitor connected between the collector of said second transistor and the base of said first transistor for shaping said integrated output signal.

6. An integrating pulse shaper comprising, a first normally non-conducting transistor having base, emitter and collector electrodes, a source of input pulses, input circuit means connected between said pulse source and the base electrode of said first transistor, a degenerative feedback circuit connected between the collector and base of said first transistor and including an integrating capacitor upon which said input pulses are impressed to develop an integrated voltage for switching said first transistor into conduction, a second normally non-conducting transistor having emitter, base and collector electrodes, circuit means connecting the collector of said first transistor with the base of said second transistor and effective during conduction of said first transistor to switch said second transistor into conduction to produce an integrated output pulse, said degenerative feedback circuit being effective to limit the current gain of said first transistor during conduction, and a regenerative feedback circuit including a pulse shaping capacitor connected between the collector of said second transistor and the base of said first transistor, said regenerative feedback circuit being effective during switching of said second transistor to momentarily override said degenerative feedback circuit to effect shaping of said integrated output pulse.

7. An integrating pulse shaper comprising, first and second transistors of opposite conductivity types, each of said transistors including base, emitter and collector electrodes, and having a common emitter configuration, means for biasing said transistors in a normally nonconductive state, a source of input pulses, input circuit means connected between said pulse source and the base of said first transistor, a degenerative feedback circuit connected between the collector and base of said first transistor and including a first capacitor for integrating said input pulses and switching said first transistor into conduction, said first transistor producing a flow of collector current in said degenerative feedback circuit which restricts the input current supplied by said input pulses to limit the current gain of said first transistor, circuit means connecting the collector of said first transistor with the base of said second transistor and effective upon conduction of said first transistor to render said second transistor conductive to produce an integrated output signal, and a regenerative feedback circuit including a second capacitor connected between the collector of said second transistor and the base of said first transistor, said second transistor producing a momentary flow of collector current in said regenerative feedback circuit which is greater than the flow of current in said degenerative feedback circuit whereby conduction of said transistors is strongly increased to shape said integrated output signal.

No references cited.